(12) United States Patent
Stockstad

(10) Patent No.: US 6,847,319 B1
(45) Date of Patent: Jan. 25, 2005

(54) TEMPERATURE-TO-DIGITAL CONVERTER

(75) Inventor: Troy L. Stockstad, Chandler, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 0 days.

(21) Appl. No.: 10/624,394

(22) Filed: Jul. 22, 2003

(51) Int. Cl.$^7$ .................................................. H03M 1/06
(52) U.S. Cl. ........................................................ 341/119
(58) Field of Search ................................ 341/118, 119, 341/155

(56) References Cited

U.S. PATENT DOCUMENTS

| | | | |
|---|---|---|---|
| 3,672,215 A | | 6/1972 | Stout et al. |
| 3,679,992 A | | 7/1972 | Yerman |
| 4,228,684 A | | 10/1980 | Templin |
| 5,195,827 A | | 3/1993 | Audy et al. |
| 5,419,637 A | | 5/1995 | Frye et al. |
| 5,488,368 A | * | 1/1996 | Brown et al. ............... 341/119 |
| 5,982,221 A | | 11/1999 | Tuthill |
| 6,008,685 A | | 12/1999 | Kunst |
| 6,097,239 A | | 8/2000 | Miranda, Jr. et al. |
| 6,554,469 B1 | | 4/2003 | Thomson et al. |
| 6,554,470 B2 | | 4/2003 | Zhang et al. |

FOREIGN PATENT DOCUMENTS

| | | |
|---|---|---|
| DE | 003637520 | 5/1988 |
| EP | 000498799 | 5/1991 |
| EP | 000741860 | 11/1996 |
| GB | 002292221 | 2/1996 |

OTHER PUBLICATIONS

Shen–Whan Chen; Trung Duong; Min–Yih Luo; "Channel Temperature Measurement Using Pulse–Gate Method," IEEE Transactions on Microwave Theory and Techniques, vol. 47, No. 3, Mar. 1999, pp. 362–365.

Kaliyugavaradan, S.; Sankaran, P.; Murti, V.G.K.; "Application of Reciprocal Time Generation Technique to Digital Temperature Measurement," IEEE Transactions on Instrumentation and Measurement, vol. 43, No. 1, Feb. 1994, pp. 99–100.

Cao Hui; Huang Junnai; "Circuit Design and Implementation for Digital Temperature and Humidity Measurement and Control," ASIC, 2001. Proceedings. 4th International Conference on Oct. 23–25, 2001, pp. 502–505.

* cited by examiner

Primary Examiner—Brian Young
(74) Attorney, Agent, or Firm—Meyertons Hood Kivlin Kowert & Goetzel, P.C.; Jeffrey C. Hood

(57) ABSTRACT

A temperature to digital converter device is implemented by integrating a temperature sensor circuit into an analog-to-digital converter (ADC). Temperature-to-digital conversion is accomplished by first measuring a change in voltage ($\Delta V_{BE}$) across the junction of a diode when different current densities are forced through the junction. The thus obtained $\Delta V_{BE}$ is proportional to temperature. As part of the conversion processing, $\Delta V_{BE}$ is multiplied by a fixed gain, and an offset voltage value is subtracted from $\Delta V_{BE}$. The multiplication and subtraction functions are performed by a switched-capacitor integrator in a delta-sigma ADC and the ADC itself operates as the temperature-to-digital converter device, eliminating the extra amplifier and/or capacitors required when the multiplication and/or subtraction function are performed outside the ADC. Alternately, other ADC topologies that include an integrator or gain amplifier, such as pipeline ADCs and cyclic ADCs may be used in place of the delta-sigma ADC.

27 Claims, 8 Drawing Sheets

TEMPERATURE-TO-DIGITAL CONVERTER

BACKGROUND OF THE INVENTION

1. Field of the Invention

This invention relates generally to the field of integrated circuit design and, more particularly, to the design of temperature measuring devices and analog-to-digital converters in integrated circuit systems.

2. Description of the Related Art

Many digital systems, especially those that include high-performance, high-speed circuits, are prone to operational variances due to temperature effects. Devices that monitor temperature and voltage are often included as part of such systems in order to maintain the integrity of the system components. Personal computers (PC), signal processors and high-speed graphics adapters, among others, typically benefit from such temperature monitoring circuits. For example, a central processor unit (CPU) that typically "runs hot" as its operating temperature reaches high levels may require a temperature sensor in the PC to insure that it doesn't malfunction or break due to thermal problems.

Often, integrated circuit (IC) solutions designed to measure temperature in a system will monitor the voltage across a diode (or multiple diodes) at different current densities to extract a temperature value. This method generally involves amplifying (or gaining up) a small voltage generated on the diode(s), and then subtracting voltage from the amplified temperature-dependent voltage in order to center the amplified (gained) value for conversion by an analog-to-digital converter (ADC). In other words, temperature-to-digital conversion for IC-based temperature measuring solutions is often accomplished by measuring a difference in voltage across the terminals of typically identical diodes when different current densities are forced through the PN junctions of the diodes. The resulting change in the base-emitter voltage between the diodes ($\Delta V_{BE}$) is generally proportional to temperature. More specifically, a relationship between the base-emitter voltage ($V_{BE}$) and temperature is defined by the equation $$V_{BE} = \frac{kT}{q}\ln\frac{I}{I_s}$$

where k is constant, q represents charge, T represents absolute temperature, $I_s$ represents saturation current and I represents the collector current. A more efficient and precise method of obtaining $\Delta V_{BE}$ is to supply the PN junction of a single diode with two separate and different currents in a predetermined ratio. Consequently, $\Delta V_{BE}$ may be related to temperature by the equation $$\Delta V_{BE} = \frac{kT}{q}\ln(N)$$

where N is a constant representing a preselected ratio of the two separate currents that are supplied to the PN junction of the diode.

A typical dynamic range of $\Delta V_{BE}$, however, is small relative to dynamic ranges that are typical of analog-to-digital converters (ADCs). That is, $\Delta V_{BE}$, which is used to measure the PN junction temperature, generally has a small dynamic range, for example on the order of around 60 mV in some systems. Therefore it is generally required to further process $\Delta V_{BE}$ in order to match the dynamic range of ADCs.

Typically, in order to obtain the desired conversion values at various temperatures, $\Delta V_{BE}$ is multiplied by a large gain, and then centered to zero, which can be accomplished by subtracting a fixed voltage.

In general, implementations today perform the temperature signal processing (TSP) in a separate temperature sensor circuit that generates a sufficiently large voltage signal, which is fed into a separate ADC that may have been designed using a number of different topologies. Temperature-to-digital converters (TDC) of such implementations usually contain complex circuits with high power dissipation. The yield of these TDCs during the fabrication process may also be low as there are many components that need to be matched for a given process spread.

An example of a typical temperature measurement system, which includes an ADC, is illustrated in FIG. 1. A TSP circuit 100 is coupled to an ADC 130. TSP 100 may comprise current sources 104 and 106, where a current provided by 104 is an integer (N) multiple of a current provided by 106, a diode 102, an integration capacitor 126, an offset capacitor 122, a gain capacitor 124, and an operational amplifier (OP-AMP) 120, interconnected as illustrated in FIG. 1. P1 110 and P2 112 represent non-overlapping clocks that provide switching between two circuit configurations as shown. When P1 110 is closed, current source 104 powers TSP 100 and P2 112 is open. Similarly, when P2 112 is closed, current source 106 powers TSP 100 and P1 110 is open. Switching between current sources 104 and 106, different currents are forced through the junction of diode 102 resulting in a change in diode-junction-voltage ($\Delta V_{BE}$). Although omitted in FIG. 1, it should be understood that when either P1 110 or P2 112 is open, the respective uncoupled current source may be shunted to ground. In the circuit configuration shown, voltage sampling occurs when P1 110 is closed, and charge transfer takes place when P2 112 is closed. In other words, during operation, switching from a configuration of P1 110 closed and P2 112 open to a configuration of P1 110 open and P2 112 closed, results in $\Delta V_{BE}$ effectively "pumping" charge to gain capacitor 124, which in turn leads to integration capacitor 126 also receiving a charge. More specifically, opening P1 110 and closing P2 112 results in a value drop of diode-junction-voltage $V_{BE}$, expressed as $\Delta V_{BE}$. Consequently, $\Delta V_{BE}$ appears across the terminals of capacitor 126, in case capacitor 126 is equal in value to capacitor 124. If capacitor 124 is greater in value than capacitor 126, then $\Delta V_{BE}$ will be amplified, or "gained up", hence an amplified value Vtemp 130 will appear at the output of OP-AMP 120. Voffset 132 is subtracted through offset capacitor 122.

Voltage-temperature relationships characterizing TSP 100 may be described by the following equations:

$Vtemp = C_I/C_T * \Delta V_{BE}(T) - C_I/C_O * Voffset$, where $C_I/C_T = (ADC \text{ dynamic range})/(\Delta V_{BE}(Tmax) - \Delta V_{BE}(Tmin))$, and $Voffset = (C_I/C_T * \Delta V_{BE}(Tmax) - (ADC \text{ dynamic range})) * C_O/C_1$.

Tmax and Tmin represent maximum and minimum diode temperatures, respectively. ADC dynamic range indicates a range of valid voltage values required for proper ADC operation. Disadvantages of the typical system as illustrated in FIG. 1 include a need for large capacitors (such as $C_I$ and $C_T$) to meet matching requirements for a fixed-gain amplifier. Also, in order to perform a fixed-gain function, an additional amplifier is required in addition to amplifiers required to perform the ADC function.

Therefore, there exists a need for a system and method for designing a more accurate and less area-intensive temperature-to-digital converter with a reduced number of capacitor components and amplifiers.

SUMMARY OF THE INVENTION

In one set of embodiments the invention comprises a system and method for performing temperature monitoring in a digital system by capturing a change in a PN-junction voltage ($\Delta V_{BE}$), which is proportional to a temperature of the PN-junction, and using an analog-to-digital converter (ADC) to perform on $\Delta V_{BE}$ all required signal conditioning functions to output a numeric value corresponding to the temperature of the PN-junction. Various embodiments of the invention may also include performing voltage monitoring.

In one embodiment, a delta-sigma ADC is coupled to a temperature sampling circuit and a voltage sampling circuit, where the temperature sampler circuit includes a first PN-junction coupled directly to the delta-sigma ADC, in effect providing a $\Delta V_{BE}$ signal directly to the delta-sigma ADC. An integrator inherent in the delta-sigma ADC may be used to amplify $\Delta V_{BE}$, eliminating the need for a fixed gain amplifier. Amplification provided by the integrator may be used to match the voltage range of $\Delta V_{BE}$, which corresponds to the input dynamic range of the PN-junction over temperature, to the dynamic range of the delta-sigma ADC, which corresponds to the output voltage range of the delta-sigma ADC. The delta-sigma ADC may also perform subtracting an offset voltage from the amplified $\Delta V_{BE}$ to compensate for $\Delta V_{BE}$ being non-zero at the lowest operating temperature of the PN-junction, thus centering the voltage range of the amplified $\Delta V_{BE}$ to the dynamic range of the delta-sigma ADC.

In one embodiment, the delta-sigma ADC includes an auto-zeroed switched-capacitor integrator. The temperature sampling circuit may include a second and third PN-junction and a current supply that may include a first and second current source. The switched-capacitor integrator may be divided into an amplifier circuit and a set of input-capacitor network circuits. In one embodiment, the amplifier circuit includes an operational transconductance amplifier (OTA) configured with feedback integration capacitors and feedback hold capacitors. The set of input-capacitor circuits may include a temperature-mode, a voltage-mode, a reference, and an offset-reference input-capacitor network circuit. The temperature-mode input-capacitor circuit and the voltage-mode input-capacitor circuit may be selectively coupled to the amplifier circuit by a multiplexer circuit for performing temperature monitoring and voltage monitoring, respectively. The reference input-capacitor circuit may be coupled to the amplifier circuit to perform reference voltage subtraction according to the function of the delta-sigma ADC. The offset-reference input-capacitor circuit may be coupled to the amplifier circuit to perform offset voltage subtraction for centering the value range of the amplified $\Delta V_{BE}$ signal.

In one embodiment, the first, second, and third PN-junctions are coupled to the OTA through the temperature-mode input-capacitor network circuit, which includes a first and second input sample capacitor and a first and second input charge replacement capacitor. The first PN-junction may be coupled to the inputs of the OTA through the first and second input sample capacitors. The second PN-junction may be coupled to the inverting input of the OTA through the first input charge replacement capacitor. The third PN-junction may be coupled to the non-inverting input of the OTA through the second input charge replacement capacitor. In one embodiment, temperature monitoring is performed by applying the first current source to the second PN-junction and applying the second current source to the third PN-junction, while the first current source is applied to the first PN-junction during the sampling phase of the switched-capacitor integrator and the second current source is applied to the first PN-junction during the integrating phase of the switched-capacitor integrator. Current supplied by the first current source may be an integer multiple of current supplied by the second current source. Values of the input capacitors, input charge replacement capacitors, and feedback integration capacitors may be selected to obtain the desired gain and autozeroing functionality.

Thus, various embodiments of the invention may provide a means for performing temperature-to-digital conversion by applying a $\Delta V_{BE}$ signal directly to an ADC that performs all necessary signal-processing functions, including matching and centering the voltage range of $\Delta V_{BE}$ to the dynamic range of the ADC.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
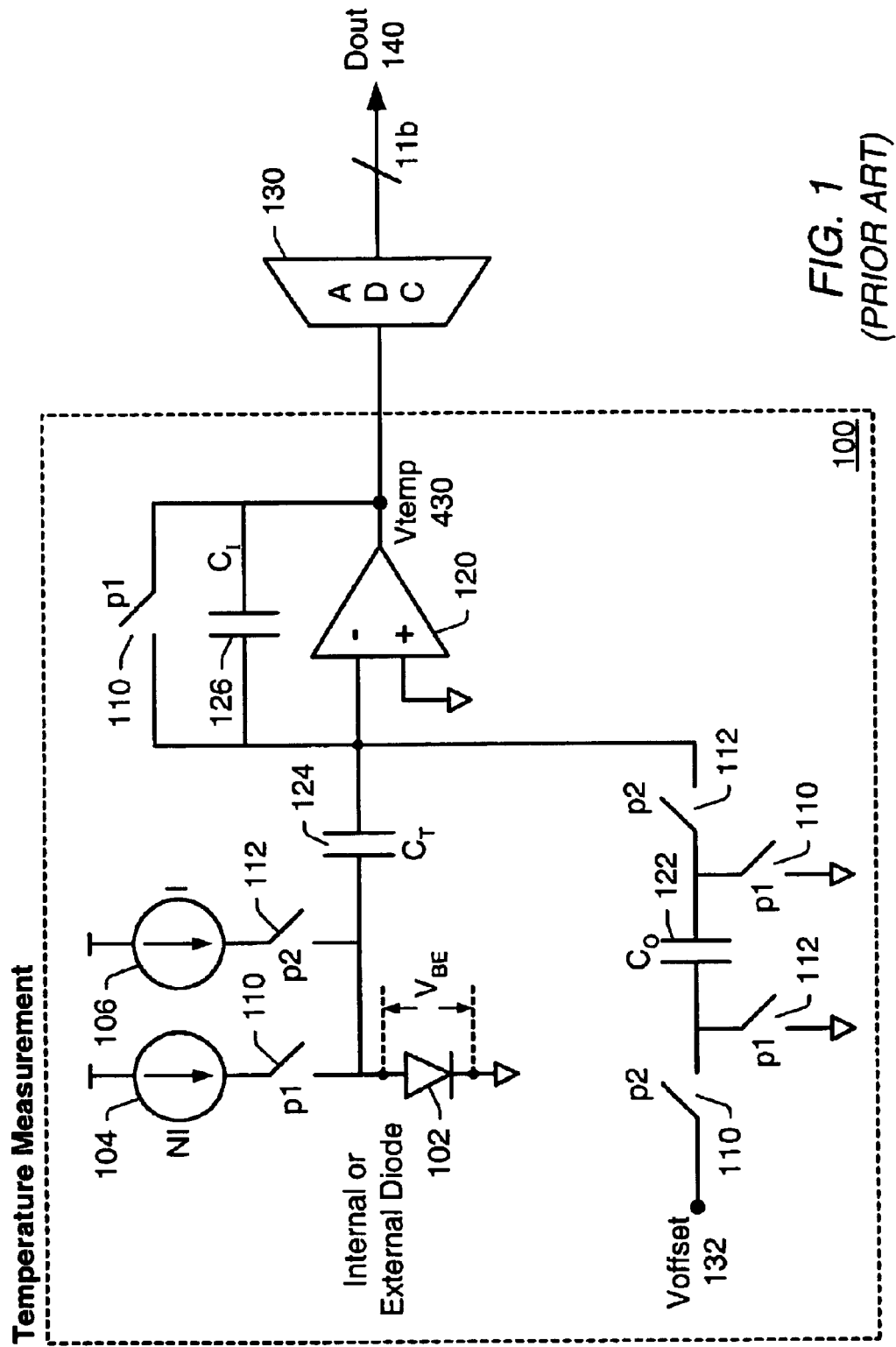
FIG. 1 illustrates one embodiment of a temperature measurement system that utilizes an ADC, in accordance with prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

As used herein, a "trigger" signal is defined as a signal that is used to initiate, or "trigger", an event or a sequence of events in a digital system. A trigger signal is said to be in a "triggering state" at a time when it initiates a desired event, or sequence of events. A periodic trigger signal may commonly be referred to as a "clock". In a "synchronous" digital system, generally a clock, commonly referred to as a "system clock", may be used for initiating most events, or sequences of events. An example of a triggering state may be, but is not limited to, a rising edge of a pulse of a clock in a synchronous digital system. A clock is referred to as a "free-running" clock when the clock is available continuously, without interruption, during operations that require the clock. In other words, a clock is not free-running when it is not available during all operations that require the clock.

When an event, or a sequence of events, is said to be initiated "in response to" receiving a stimulus signal, it may be implied that the event, or the sequence of events, is initiated as a result of a combination of a trigger signal, used in triggering the event or sequence of events, being in a triggering state at a time when the stimulus signal is asserted. In one set of embodiments, the sending of a pulse through an output port may indicate a point in time at which a leading edge of the pulse occurs at the output port, and the receiving of a pulse through an input port may indicate a point in time at which a leading edge of the pulse occurs at the input port. The term "latency" is defined as a period of time of finite length. A signal is said to be delayed "by a latency" when a time period normally required for the signal to travel from a source point to a destination point is increased by a time period equivalent to the latency, where the signal is being delayed between the source point and the destination point. The word "alternately" is meant to imply passing back and forth from one state, action, or place to another state, action, or place, respectively. For example, "alternately applying a first current source and a second current source" would mean applying the first current source, then applying the second current source, then applying the first current source, then applying the second current source, and so on.

A "diode-junction-voltage" ($V_{BE}$) refers to a voltage measured across the junction of a diode, or a difference in voltage between a voltage measured at the anode of the diode junction with respect to a common ground and a voltage measured at the cathode of the diode junction with respect to the common ground. A "change in diode-junction-voltage" ($\Delta V_{BE}$) refers to a change in diode-junction-voltage for a chosen diode, either in time or in different circuit configurations. For example, if in one circuit configuration $V_{BE}$=700 mV for a diode, and in a different circuit configuration $V_{BE}$=655 mV for the diode, then $\Delta V_{BE}$=45 mV for the diode when referencing to the two different circuit configurations. Similarly, for example, if at a time point t1 $V_{BE}$=650 mV for a diode, and at a time point t2 $V_{BE}$=702 mV for the diode, then $\Delta V_{BE}$=52 mV for the diode when referencing time points t1 and t2. A diode is used as one way of accessing a PN-junction across which voltage measurements to obtain $V_{BE}$ may be made. More generally, diode-junction may also mean PN-junction or NP-junction, which defines the physical attributes of the junction selected for obtaining temperature values through performing voltage measurements. Various embodiments of the circuit are described as utilizing a diode. However, in other embodiments, the operation performed by the diode may be achieved using other circuitry, such as a PN-junction (or NP-junction) present in devices other than a diode. Therefore, the terms PN-junction, NP-junction, diode, and diode-junction are used interchangeably, and all respective terms associated therewith may be interpreted accordingly.

Figure 2:
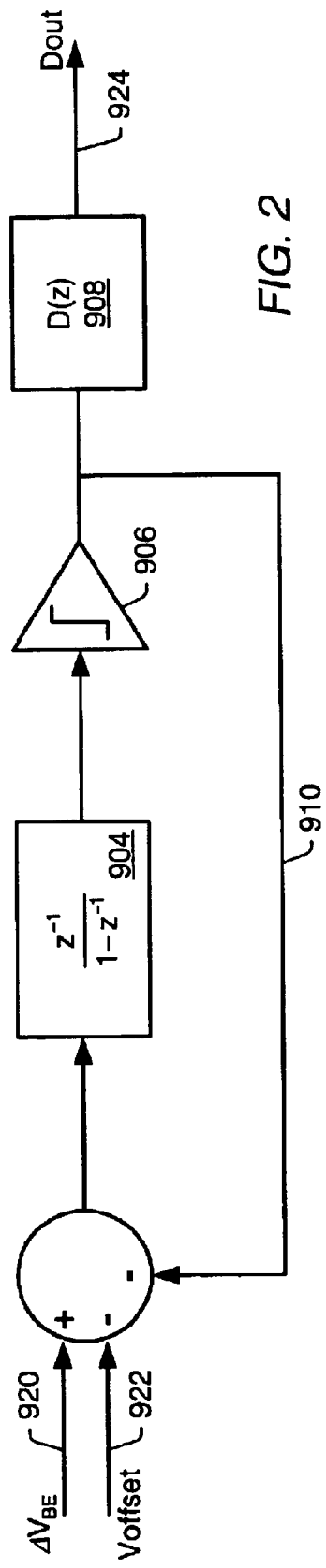
FIG. 2 illustrates a block diagram of a temperature sensor merged with a delta-sigma modulator according to one embodiment.

FIG. 2 illustrates a block diagram of one embodiment of a temperature sensor merged with a delta-sigma modulator, as proposed by the present invention. In this embodiment, an offset voltage Voffset 922 and a $\Delta V_{BE}$ 920 voltage proportional to temperature and used for temperature monitoring are input into a switched capacitor integrator 904, which is coupled to a comparator 906. The output of comparator 906 may be coupled to a filter D(z) 908, which produces a digital output Dout 924. Feedback line 910 completes a delta-sigma loop. This particular embodiment of a delta-sigma ADC is commonly referred to as a first order delta-sigma ADC since one integrator resides in the feedback loop.

Figure 3A:
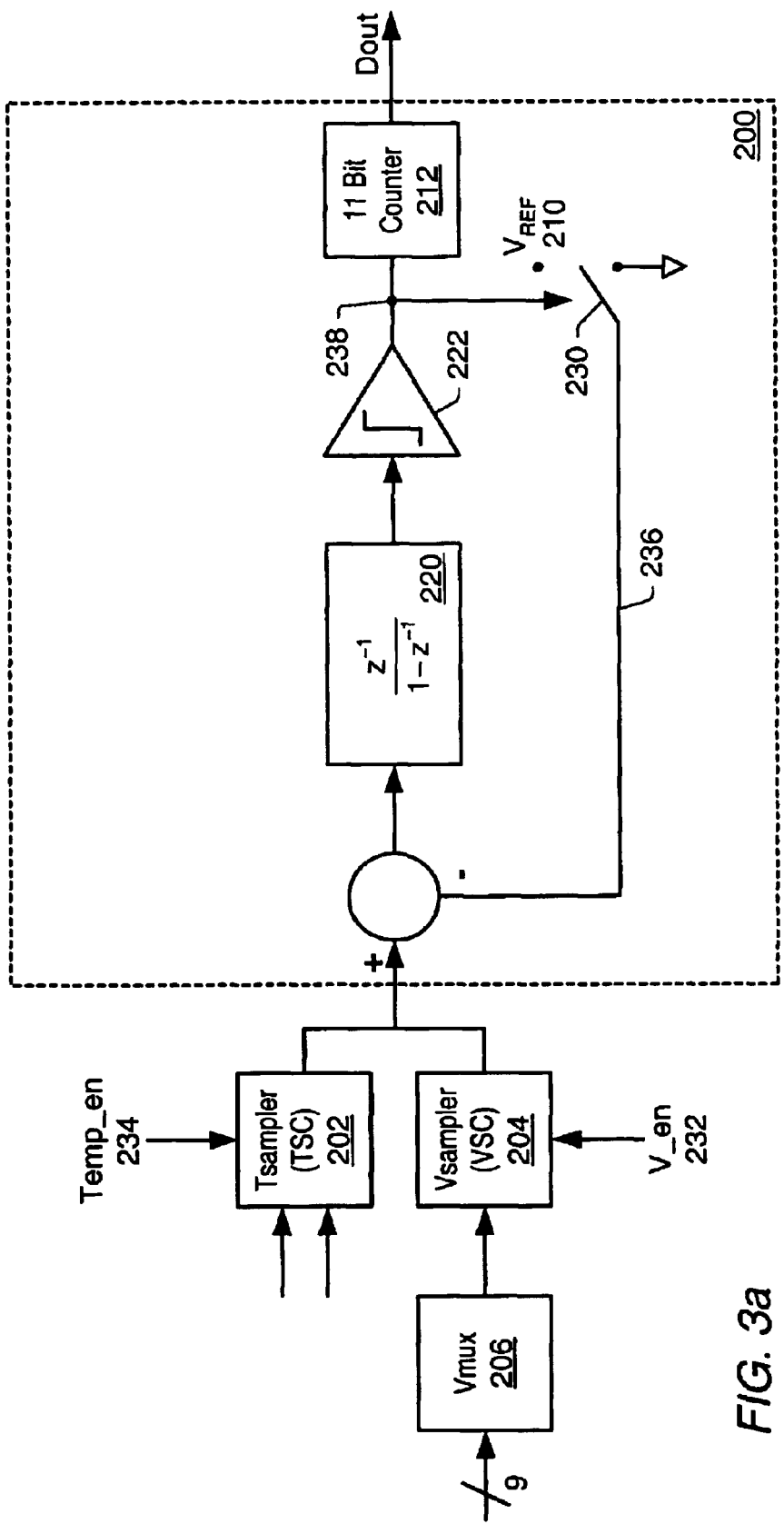
FIG. 3a illustrates a block diagram of an analog-to-digital converter system for use in a temperature-to-digital conversion according to one embodiment.

FIG. 3a illustrates a block diagram of one embodiment of an analog-to-digital converter (ADC) system used for temperature and voltage monitoring. In this embodiment, a temperature sampling circuit (TSC) 202 and a voltage sampler circuit (VSC) 204 are both coupled to an ADC 200, which includes an integrator 220, which is coupled to a comparator 222, where integrator 220 and comparator 222 are parts of a delta-sigma loop, which is coupled to an 11-bit counter 212 that produces a digital output Dout. In the embodiment shown, Counter 212 functions as a first order comb filter implemented as a simple counter that's reset every conversion cycle (accumulate and dump). Other embodiments may use different implementations and/or decimation filters. A reference voltage Vref 210 may be subtracted from the output of integrator 220 dependent upon the state of output 238 of comparator 220. In one embodiment, the output of integrator 220 rising above 0V results in a comparator 222 output equivalent to logic value "1", and similarly, the output of integrator 220 falling to 0V or below results in a comparator 222 output equivalent to logic value "0". In case of a comparator 222 output of "1", switch 230 may be toggled to Vref, in effect subtracting Vref from integrator 220 output during a subsequent clock cycle. Similarly, a comparator 222 output of "0" may lead to switch 230 being toggled to Ground (0V), leaving the output of integrator 220 unaffected by Vref 210. This presents one possible method of bounding the output range of integrator 220 to ±Vref, and is represented in FIG. 3a as reference feedback loop 236 coupling switch 230 to integrator 220.

Referring again to FIG. 3a, a Voltage Multiplexer (VMUX) 206 may be coupled to VSC 204 to provide capability of monitoring a variety of different voltages. VSC 204 may consist of capacitors and switching circuits that perform sampling of either single-ended or differential input voltages, and may generate a differential output voltage for input into ADC 220. TSC 202 and VSC 204 may be individually enabled by enable signal Temp_en 234 to perform temperature monitoring, and V_en 232 to perform voltage monitoring, respectively. In other words, during "voltage monitoring mode", also referred to herein as "voltage-mode", VSC 204 is enabled and is functioning while TSC 202 is disabled and is not functioning. Similarly, during "temperature monitoring mode" TSC 202 is enabled and is functioning while VSC 204 is disabled and is not functioning. While the embodiment shown uses enable signals (Temp_en 234 and V_en 232) as one possible way to turn TSC 202 and VSC 204 on and off respectively, it is in no way limited to employing enable signals, and alternate methods may be used for selecting between TSC 202 and VSC 204.

Figure 3B:
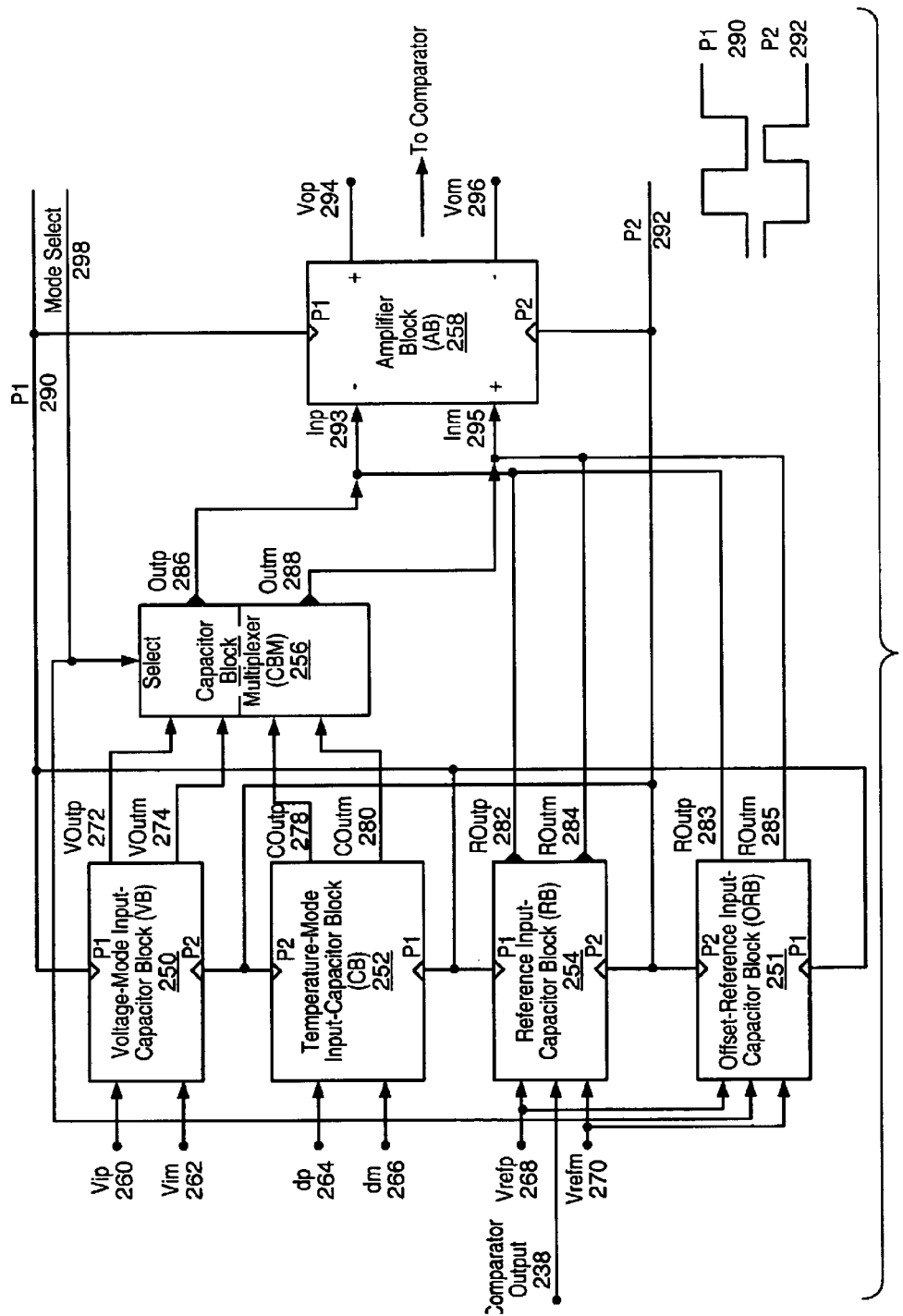
FIG. 3b illustrates a block diagram of a switched capacitor integrator according to one set of embodiments of the present invention.

FIG. 3b illustrates a block diagram of a switched capacitor integrator block according to one embodiment of the present invention. In this embodiment, integrator 220 (FIG. 3a) includes a voltage-mode input capacitor block (VB) 250, a temperature-mode input capacitor block (CB) 252, a reference input capacitor block (RB) 254, an offset-reference input capacitor block (ORB) 251, a capacitor block multiplexer (CBM) 256, and an amplifier block (AB) 258. VB 250 may receive Vip 260 and Vim 262 from VSC 204 as differential voltage inputs. Similarly, CB 252 may receive as inputs dp 264 and dm 266 from TSC 202, and RB 254 may receive as inputs Vrefp 268 and Vrefm 270 from a reference voltage source, as well as output 238 from comparator 222. ORB 251 may also receive Vrefp 268 and Vrefm 270 as inputs. Output pair Voutp 272 and Voutm 274 generated by VB 250, and output pair Coutp 278 and Coutm 280 generated by CB 252 may be coupled as inputs to CBM 256. In one embodiment, mode select signal 298 is used to select output pair Voutp 272 and Voutm 274 for performing voltage monitoring. Similarly, mode select 298 may be used to select output pair Coutp 278 and Coutm 280 for performing temperature monitoring, as well as enabling operation of ORB 251 during temperature monitoring. The respective output pairs may be routed through Outp 286 and Outm 288 to input ports Inp 293 and Inm 295 of AB 258, respectively. AB 258 output ports Vop 294 and Vom 296 may be coupled to comparator 222 illustrated in FIG. 3a. Inp 293 may be an inverting input of an amplifier with corresponding non-inverting output Vop 294, and Inm 295 may be a non-inverting input of the amplifier with corresponding inverting output Vom 296. Output pair Routp 282 and Routm 284 of RB 254, and output pair Routp 283 and Routm 285 of ORB 251 may also be coupled to Inp 293 and Inm 295, respectively. In the embodiment shown in FIG. 3b, RB 254 and ORB 251 are in effect connected to AB 258 in parallel with CBM 256 (and hence in parallel with either VB 250 or CB 252 depending on which one is selected through CBM 256 by mode select 298), thus implementing the reference feedback loop 236 illustrated in FIG. 3a., and subtraction of Voffset 922 illustrated in FIG. 2, respectively. As noted above, subtraction of Voffset 922 occurs during temperature monitoring mode. In one embodiment, P1 290 and P2 292 represent non-overlapping clock signals used to perform switching in the switched-capacitor networks included in VB 250, CB 252, RB 254, and AB 258.

Figure 4:
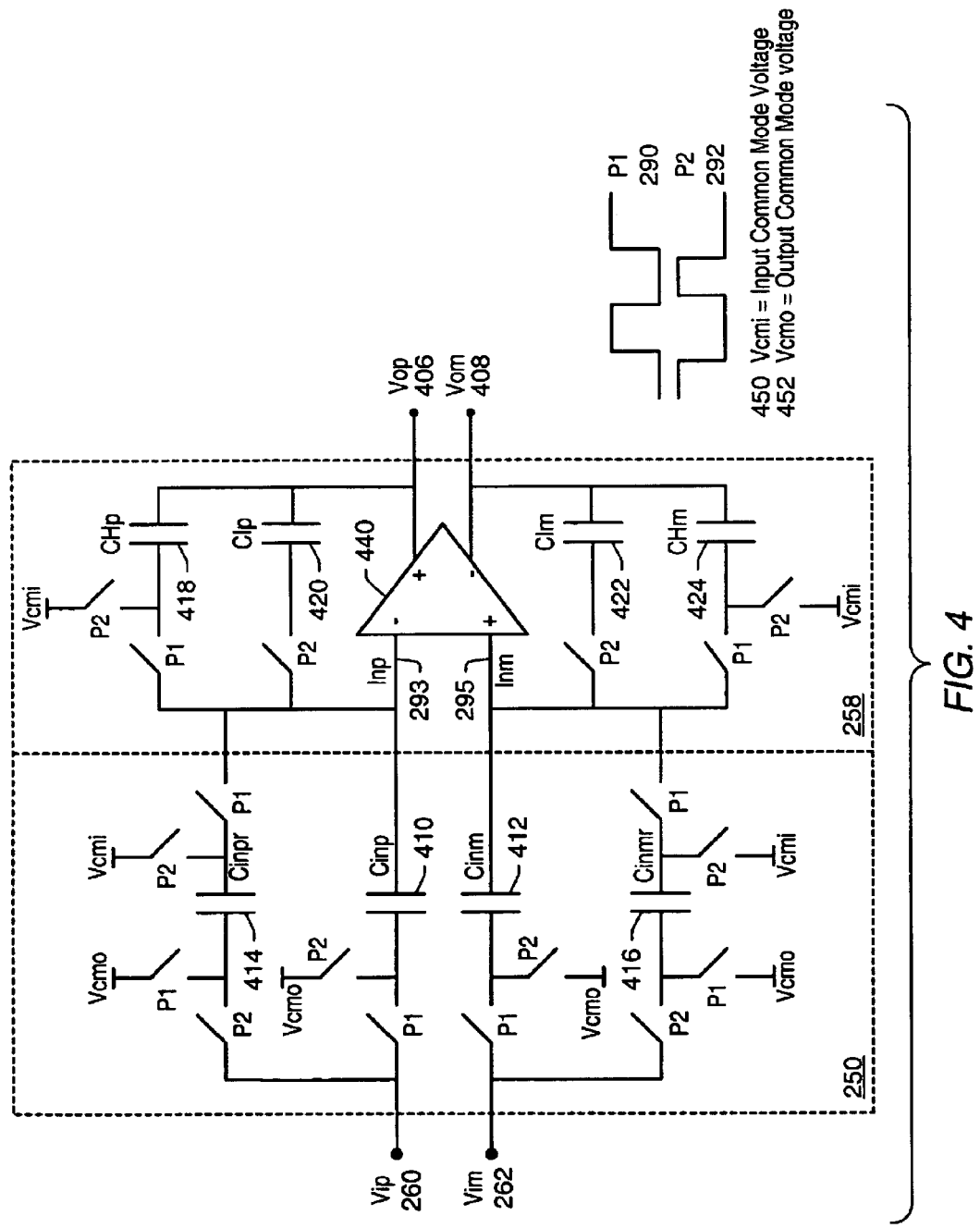
FIG. 4 illustrates a circuit diagram of one embodiment of an auto-zeroed switched capacitor integrator configured for voltage monitoring.

FIG. 4 illustrates a circuit diagram of one embodiment of a switched capacitor integrator configuration used when voltage monitoring is performed. In this configuration, referred to as voltage-mode configuration, VB 250 and AB 258 may be coupled together through CBM 256 to form a first functional configuration of switched capacitor integrator 220. In one embodiment, AB 258 includes an amplifier 440 with inputs Inp 293 and Inm 295 and corresponding outputs Vop 294 and Vom 296, integration capacitors CIp 420 and CIm 422, and output hold capacitors CHp 418 and CHm 424. Amplifier 440 may be an operational transconductance amplifier (OTA). VB 250 may be implemented using input sample capacitors Cinp 410 and Cinm 412, and charge replacement capacitors Cinpr 414 and Cinmr 416, interconnected into the network as shown in FIG. 4. Mutually exclusive clocks P1 290 and P2 292 may be used as switching devices to perform switching in the circuit as also shown in FIG. 4. When P1 290 is closed and P2 292 is open, the circuit is operating in the sampling phase, also referred to as the autozeroing phase, and voltages at inputs Vip 260 and Vim 262 are sampled and converted to charge stored at Cinp 410 and Cinm 412, respectively. With P1 290 open and P2 292 closed, the circuit is operating in the integration phase, and the respective charges at Cinp 410 and Cinm 412 are transferred to CIp 420 and CIm 422, respectively. Cinpr 414 and Cinmr 416, and CHp 418 and CHm 424 provide auto-zeroing functionality, removing the offset/finite-gain error of the OTA by storing the charge corresponding to the error on Cinp 410 and Cinm 412. Also, values for Cinpr 414 and Cinmr 416 may be selected in terms of Cinp 410 and Cinm 412, respectively, such that a differential voltage between Vop 294 and Vom 296 remain essentially unchanged when switching from the integration phase to the autozeroing phase. This may be accomplished by selecting the value of Cinpr 414 to equal the value of Cinp 410 and the value of Cinmr 416 to equal the value of Cinm 412.

Figure 5A:
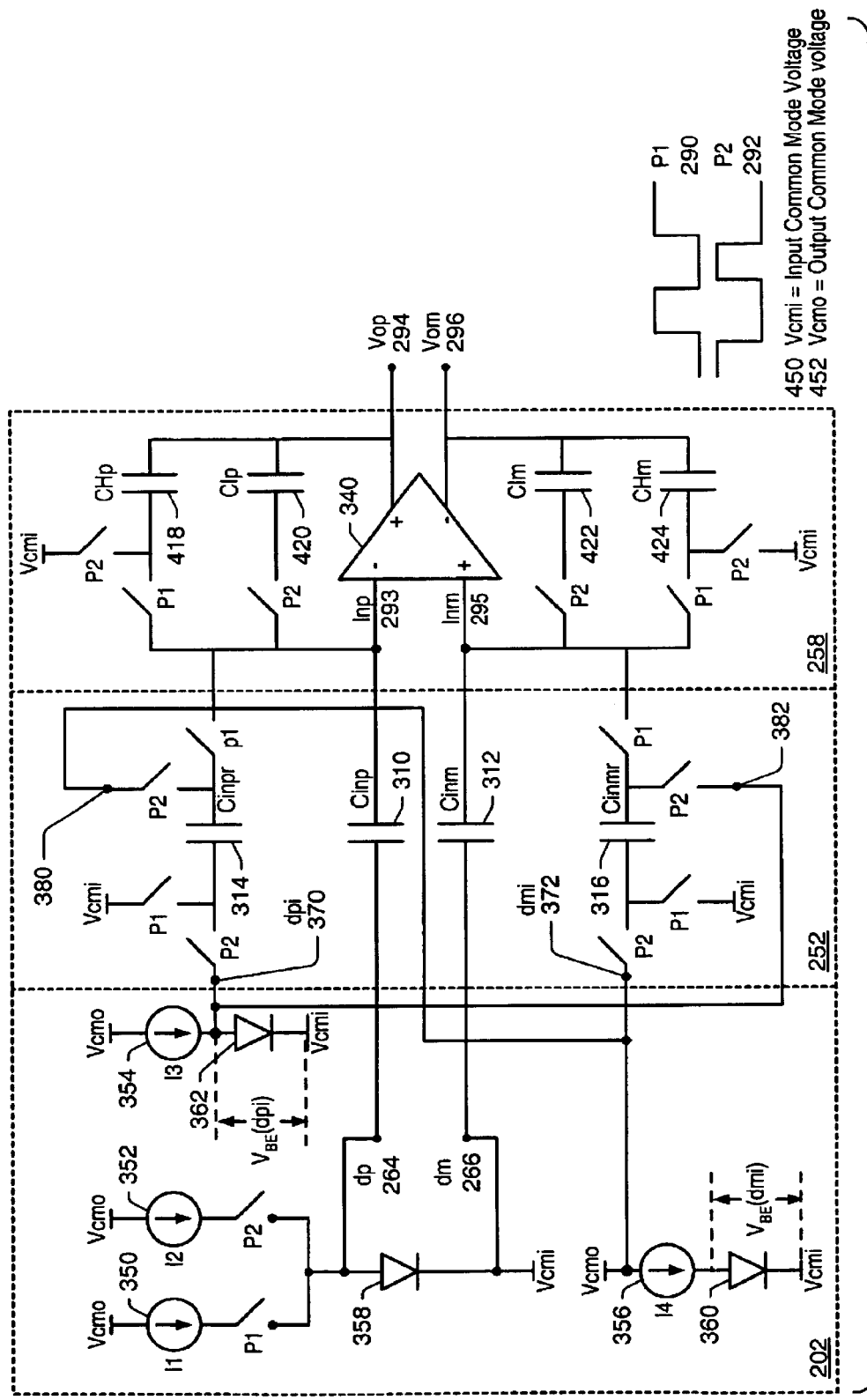
FIG. 5a illustrates a circuit diagram of an auto-zeroed switched capacitor integrator with a coupled temperature sampler circuit, configured for temperature monitoring in accordance with one set of embodiments of the present invention.

FIG. 5a illustrates a circuit diagram of one embodiment of the switched capacitor integrator configuration used when temperature monitoring is performed. In this configuration, referred to as temperature-mode configuration, CB 252 and AB 258 may be coupled together through CBM 256 to form a second functional configuration of switched capacitor integrator 220. AB 258 may be configured as was illustrated in FIG. 4, and similarly, amplifier 440 may be an operational transconductance amplifier (OTA). In one embodiment, TSC 202 is coupled to CB 252 to provide temperature-monitoring input. CB 252 may be implemented using input sample capacitors Cinp 310 and Cinm 312, and charge replacement capacitors Cinpr 314 and Cinmr 316, interconnected into a network as shown. Mutually exclusive clocks P1 290 and P2 292 may be used as the switching devices to perform switching in a manner similar as illustrated in FIG. 4. In the embodiment shown, TSC includes current sources I1 350, I2 352, I3 354, and I4 356, as well as diodes 358, 360, and 362. The anode of diode 358 may be connected to input dp 264, while the cathode of diode 354 may be connected to input dm 266, which itself may be coupled to Vcmi 450. The magnitude of the current provided by I1 350 may be a multiple N of the magnitude of the current provided by I2 352, where N is an integer number. Similarly, the magnitude of the current provided by I3 354 may be a multiple N of the current provided by I4 356. In other words, I1 350 and I3 354 may each provide respective currents of equal magnitude, and I2 352 and I4 356 may each provide respective currents of equal magnitude. In the embodiment shown, I3 354 powers diode 362 and I4 356 powers diode 360, resulting in diode-junction-voltages $V_{BE}$(dpi) and $V_{BE}$(dmi), respectively. The difference between the magnitude of $V_{BE}$(dpi) and the magnitude of $V_{BE}$(dmi) may correspond to $\Delta V_{BE}$, which is generated across diode 358 when switching from the sampling phase to the integration phase, that is, when P1 is switched from an on position to an off position and, correspondingly, P2 is switched from an off position to an on position.

Operation of the circuit shown in FIG. 5a is similar to that shown in FIG. 4 when applying P1 290 and P2 292. Again, when P1 290 is closed and P2 292 is open, the circuit is operating in the sampling phase. However, unlike in the voltage-configuration illustrated in FIG. 4 where P1 290 was used to couple Vip 260 to Cinp 410, and to couple Vim 362 to Cinm, dp 264 may be directly coupled to Cinp 310, and dm 266 may be directly coupled to Cinm 312. As a result of this direct coupling, charge is being generated at Cinp 310 and Cinm 310 during both the sampling phase and the integration phase. By coupling the anode of diode 362 to dpi 370, and the anode of diode 360 to dmi 372, a voltage of the same magnitude as $\Delta V_{BE}$ across diode 358 may be generated between dpi 370 and dmi 372. $\Delta V_{BE}$ refers to a change in voltage across diode 358 as described in the previous paragraph. In one embodiment, diode 358 may be an external diode outside of the packaged integrated circuit, while diode 362 and diode 360 may reside on the same silicon as the rest of the circuitry. In alternate embodiments all diodes may be configured on the same silicon, though it is not required that any or all diodes be configured on the same silicon. When P1 290 is open and P2 292 is closed, the circuit is again operating in the integration phase, and charge present at Cinp 310 is transferred to CIp 420, and charge present at Cinm 312 is transferred to CIm 422. During the integration phase (P2 292 closed) $V_{BE}$ across dp 264 and dm 266 decreases, resulting in Cinp 310 and Cinm 312 "pumping" charge through CIp 420 and CIm 422, respectively, due to voltage gain provided by OTA 340. By having the anode of diode 362 connected to node 382 and the anode of diode 360 connected to node 380, $\Delta V_{BE}$ may appear between input terminals Inp 293 and Inm 295 of OTA 340 and may be amplified by OTA 340. Cinpr 314 and Cinmr 316, and CHp 418 and CHm 424 provide auto-zeroing functionality, removing the offset/finite-gain error of the OTA by storing the charge corresponding to the error on Cinp 310 and Cinm 312. The value of Cinp 310 may be chosen to be twice the value of Cinpr 314, and the value of Cinm 312 may be chosen to be twice the value of Cinmr 316, enabling the differential voltage between Vop 294 and Vom 296 to remain essentially unchanged when switching from the integration phase to the autozeroing (sampling) phase in this configuration. An example of voltage selection for Vcmi 450 and Vcmo 452 may be 0.75V and 1.5 V, respectively.

Figure 5B:
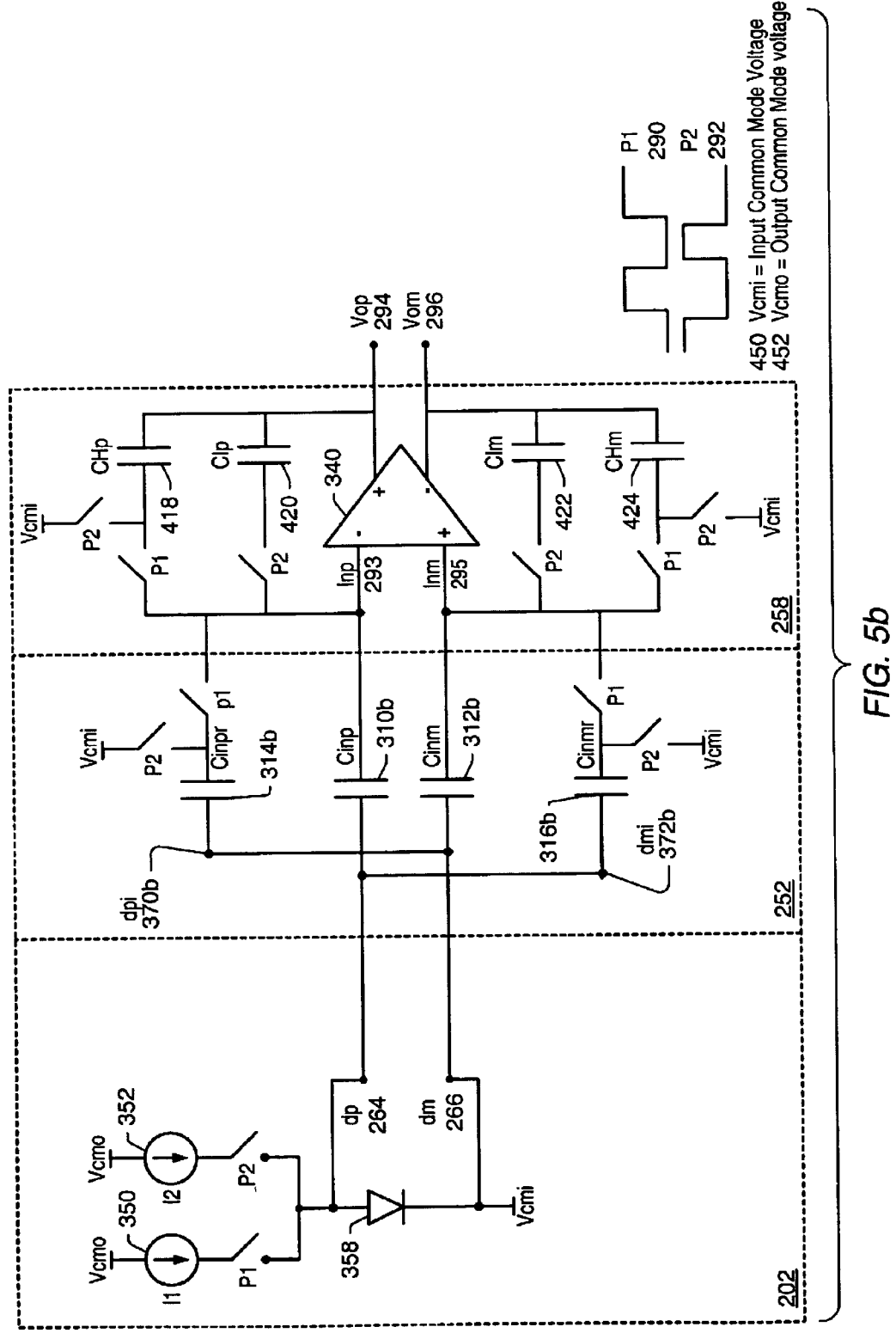
FIG. 5b illustrates a circuit diagram of an alternate embodiment of an auto-zeroed switched capacitor integrator with a coupled temperature sampler circuit, configured for temperature monitoring in accordance with the present invention.

FIG. 5b illustrates a circuit diagram of an alternate embodiment of the switched capacitor integrator configuration used when temperature monitoring is performed. In this particular temperature-mode configuration, AB 258 may again be configured as was illustrated in FIG. 5a, and similarly, amplifier 440 may be an OTA. TSC 202 may again be coupled to CB 252 to provide temperature-monitoring input. CB 252 may be implemented using input sample capacitors Cinp 310b and Cinm 312b, and charge replacement capacitors Cinpr 314b and Cinmr 316b, interconnected into a network as shown. Mutually exclusive clocks P1 290 and P2 292 may again be used as the switching devices to perform switching in a manner similar as illustrated in FIG. 5a. In the embodiment shown, TSC includes current sources I1 350 and I2 352, and diode 358. Similar to the embodiment in FIG. 5a, the anode of diode 358 may be connected to input dp 264, while the cathode of diode 354 may be connected to input dm 266, which itself may be coupled to Vcmi 450. The magnitude of the current provided by I1 350 may be a multiple N of the magnitude of the current provided by I2 352, where N is an integer number. In one embodiment, $\Delta V_{BE}$ is generated across diode 358 when switching from the sampling phase to the integration phase, that is, when P1 is switched from an on position to an off position and, correspondingly, P2 is switched from an off position to an on position.

Operation of the circuit shown in FIG. 5b is similar to that shown in FIG. 5a when applying P1 290 and P2 292. Again, when P1 290 is closed and P2 292 is open, the circuit is operating in the sampling phase. Again, dp 264 may be directly coupled to Cinp 310b, and dm 266 may be directly coupled to Cinm 312b, resulting in charge being generated at Cinp 310b and Cinm 310b during both the sampling phase and the integration phase. As in FIG. 5a, diode 358 may be an external diode outside of the packaged integrated circuit, or it may be configured on the same silicon as the packaged integrated circuit. When P1 290 is open and P2 292 is closed, the circuit is again operating in the integration phase, and charge present at Cinp 310b is transferred to CIp 420, and charge present at Cinm 312b is transferred to CIm 422. During the integration phase (P2 292 closed) $V_{BE}$ across dp 264 and dm 266 decreases, resulting in Cinp 310b and Cinm 312b "pumping" charge through CIp 420 and CIm 422, respectively, due to voltage gain provided by OTA 340. Cinpr 314b and Cinmr 316b, and CHp 418 and CHm 424 provide auto-zeroing functionality, removing the offset/finite-gain error of the OTA by storing the charge corresponding to the error on Cinp 310b and Cinm 312b. Cinp 310b, Cinm 312b, Cinpr 314b, and Cinmr 316b, may all be selected to be of the same value, respectively, enabling the differential voltage between Vop 294 and Vom 296 to remain essentially unchanged when switching from the integration phase to the autozeroing (sampling) phase in this configuration. An example of voltage selection for Vcmi 450 and Vcmo 452 may again be 0.75V and 1.5 V, respectively.

Referring back to FIG. 5a and FIG. 5b, if the operating temperature range of each diode (358, 360, and 362) is bounded by a minimum temperature T(min) and a maximum temperature T(max), there is a $\Delta V_{BE}$(min) corresponding to T(min) and a $\Delta V_{BE}$(max) corresponding to T(max). In one embodiment, temperatures for diodes 358, 360, and 362 range from −128° C. to 128° C., respectively. In this embodiment, a corresponding voltage range of $\Delta V_{BE}$ for any of the diodes shown may be 35 mV to 100 mV, or 0.035V to 0.1V. For example, when diode 358 operates at a temperature of −128° C., switching from sampling mode to integration mode results in a $\Delta V_{BE}$ value of 35 mV across diode 358. In order to measure across the entire temperature range of diodes 358, 360, and 362, respectively, the temperature range has to be correlated to the dynamic range of ADC 200. The dynamic range of ADC may be defined as ±Vref in terms of reference voltage Vref 210. For example, if 1.5V is selected for Vref 210, the dynamic range of ADC 200 may be 0V to 1.5V. Since $\Delta V_{BE}$ is small relative to the full-scale voltage of ADC 200, $\Delta V_{BE}$ is amplified such that the range of $\Delta V_{BE}$ values matches the dynamic range of ADC 200. A gain for matching the value range of $\Delta V_{BE}$ to the dynamic range of ADC 200 may be expressed by the following equation:

$$\text{Gain}=G=V\text{ref}/\Delta V_{BE}(\text{max})-\Delta V_{BE}(\text{min}). \tag{1}$$

This gain may be implemented by selecting the value of Cinp 310 to be a multiple G of CIp 420 and the value of Cinm 312 to be a multiple G of CIm 422. Also, since $\Delta V_{BE}$(min) is not 0, an offset voltage is subtracted to center the range of amplified $\Delta V_{BE}$ values to stay within the valid dynamic range of ADC 200. The value of the offset voltage in terms of Vref may be expressed by the following equation:

$$V\text{offset}=(G*\Delta V_{BE}(\text{max})-V\text{ref}). \tag{2}$$

ORB 251, as shown in FIG. 3b, may perform the function of subtracting the offset voltage.

Figure 6:
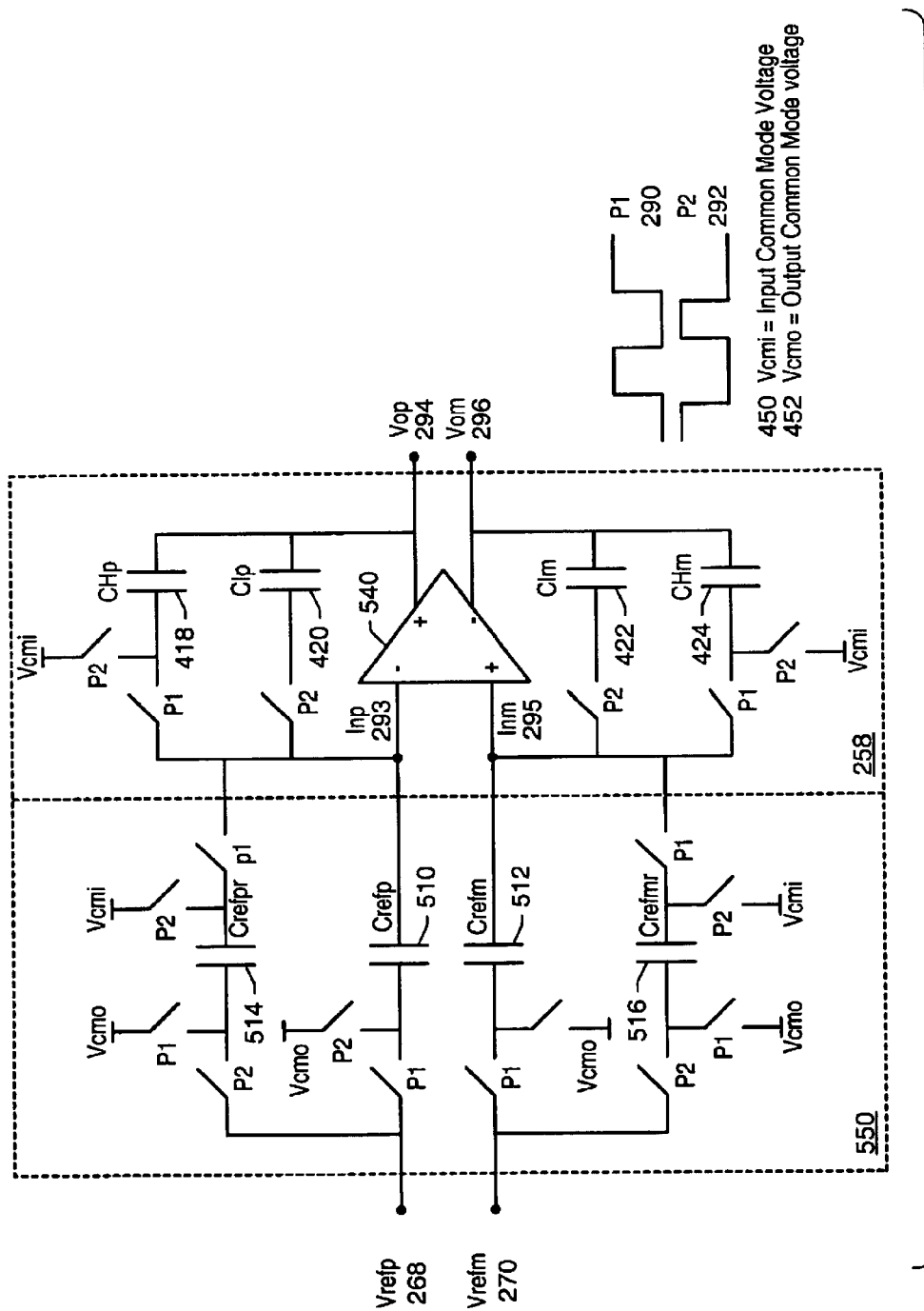
FIG. 6 illustrates a circuit diagram of one embodiment of a reference input configuration for a switched capacitor integrator.

FIG. 6 illustrates a circuit diagram of one embodiment of a reference input configuration for a switched capacitor integrator. Input capacitor block 550 may be implemented using reference input sample capacitors Crefp 510 and Crefm 512, and reference input charge replacement capacitors Crefpr 514 and Crefmr 516 interconnected into a capacitor network as shown. In the embodiment in FIG. 6, AB 258 is implemented as illustrated in FIG. 5. Depending on value selections of Crefp 510, Crefm 512, Crefpr 514 and Crefmr 516, input capacitor block 550 may be used as RB 254 and ORB 251. In other words, the circuit topology and inputs of RB 254 and ORB 251 may be implemented as input capacitor block 550, with both RB 254 and ORB 251 receiving Vrefp 268 and Vrefm 270 and containing the capacitor networks configured in input capacitor block 550. RB 254 may also receive comparator 222 output 238, which acts as an additional switch enabling and disabling P2 292 in RB 254 depending on its value. More specifically, when comparator 222 output 238 has a logic value of "1", P2 292 is enabled in RB 254. In other words, during the integration phase if comparator 222 output 238 is at a logic value "1", charge transfer from Crefp 510 to CIp 420 and from Crefm 512 to Cim 422 is enabled. Similarly, if comparator 222 output 238 is at a logic value of "0" during the integration phase, charge transfer will not take place in RB 254, even if P2 292 is closed and P1 290 is open. Charge transfer inside ORB 251 may take place during each integration phase, in effect providing subtraction of the offset voltage to center the value range of $\Delta V_{BE}$ to match the dynamic range of ADC 200.

In one embodiment, values of Crefp 510, Crefpr 514, Crefm 512 and Crefmr 516 for ORB 251 may be selected based on the Voffset_gain defined in equation (2) above, as defined in the following equations:

$$Crefp=Crefpr=CIp*(Voffset\_gain/Vref) \quad (3)$$

$$Crefm=Crefmr=CIm*(Voffset\_gain/Vref). \quad (4)$$

Values of Crefp 510, Crefpr 514, Crefm 512 and Crefmr 516 for implementing RB 254 may be chosen such that a unity gain is maintained in order for the proper Vref value to be subtracted during the integration phase when comparator 222 output 238 is at a logic value of "1". Selection of the corresponding values are defined in the following equations:

$$Crefp=Crefpr=CIp \quad (5)$$

$$Crefm=Crefmr=CIm. \quad (6)$$

In a preferred embodiment, CIp 420 and CIm 422 are each assigned a value of IpF, and CHp 418 and CHm 424 are each assigned a value of 0.5 pF. In conjunction, Cinp 410, Cinm 412, Cinpr 414 and Cinmr 416 are each assigned a value of 1 pF, Cinp 310, Cinm 312, Cinp 310b, Cinm 312b, Cinpr 314b, and Cinmr 316b are each assigned a value of 24 pF, and Cinpr 314 and Cinmr 316 are each assigned a value of 12 pF. Correspondingly, Crefp 510, Crefm 512, Crefpr 514 and Crefmr 516 included in RB 254 are each assigned a value of 1 pF, and Crefp 510, Crefm 512, Crefpr 514 and Crefmr 516 included in ORB 251 are each assigned a value of 0.3 pF.

While various embodiments of the invention are described with diodes 358, 360, and 362 being part of one physical circuit that also includes the ADC, other embodiments may have the diodes externally coupled to the ADC. Similarly, while various embodiments of the invention are also described as combining temperature input signal conditioning with the integration function of a delta-sigma ADC, the invention may combine in a similar manner the temperature input signal conditioning with corresponding functions of other ADC architectures that include an integrator or gain amplifier, for example pipeline ADCs and cyclic ADCs.

Thus, various embodiments of the systems and methods described above may facilitate the design of an accurate and less area-intensive temperature-to-digital converter and digital monitoring system, with a reduced number of capacitor components and amplifiers. Such converters may be implemented without recourse to voltage conditioning circuitry, such as amplifiers and reference voltage offsets, present outside any analog-to-digital converters that may be used in implementing the digital monitoring. Furthermore, analog-to-digital converters implemented in accordance with various embodiments of the present invention may not be limited to temperature monitoring, but may in addition be used to monitor other characteristics of a system as well, such as various voltages sources present in the system.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A mixed-signal monitoring system comprising:
   an analog-to-digital converter (ADC); and
   a temperature sampler circuit, wherein the temperature sampler circuit comprises a first PN-junction coupled directly to the ADC;
   wherein the temperature sampler circuit is operable to generate a temperature voltage signal ($\Delta V_{BE}$) proportional to a temperature of the first PN-junction;
   wherein $\Delta V_{BE}$ represents a change in voltage across the first PN-junction; and
   wherein the ADC is operable to:
      amplify the $\Delta V_{BE}$ signal, resulting in an amplified $\Delta V_{BE}$ signal;
      subtract an offset voltage from the amplified $\Delta V_{BE}$ signal; and
      output a digital numeric value representative of the temperature of the first PN-junction.

2. The mixed-signal monitoring system of claim 1, wherein the first PN-junction is a diode.

3. The mixed-signal monitoring circuit of claim 1, wherein the first PN-junction is derived from a transistor.

4. The mixed-signal monitoring system of claim 1, wherein the first PN-junction and the ADC are comprised on one integrated circuit.

5. The mixed-signal monitoring system of claim 1 further comprising a voltage sampler circuit coupled to the ADC, wherein the voltage sampler circuit is operable to:
   receive and sample one or more of:
      a single-ended input voltage; and
      a differential input voltage;
   generate a differential output voltage; and
   provide the differential output voltage to the ADC.

6. The mixed-signal monitoring system of claim 5 further comprising a voltage multiplexer circuit operable to selectively couple one of a plurality of available single-ended input voltages to the voltage sampler circuit.

7. The mixed-signal monitoring system of claim 5 further comprising an enable circuit operable to:
   selectively enable the voltage sampler circuit during a voltage monitoring mode; and
   selectively enable the temperature sampler circuit during a temperature monitoring mode.

8. The mixed-signal monitoring system of claim 5, wherein the ADC comprises:
an amplifier having an input and an output;
a reference input-capacitor circuit coupled to the amplifier and configured to selectively decrease voltage at the output of the amplifier by a reference voltage amount;
an offset-reference input-capacitor circuit coupled to the amplifier and configured to decrease voltage at the output of the amplifier by an offset voltage amount;
a temperature-mode input-capacitor circuit operable to couple the first PN-junction to the input of the amplifier;
a voltage-mode input-capacitor circuit operable to couple the voltage sampler circuit to the input of the amplifier;
a circuit selection device;
a comparator circuit coupled to the output of the amplifier; and
an output filter coupled to an output of the comparator circuit;
wherein the output of the comparator circuit is coupled to a respective input of the reference input-capacitor circuit;
wherein the circuit selection device is operable to couple the amplifier circuit to:
the temperature-mode input-capacitor circuit during the temperature monitoring mode; and
the voltage-mode input-capacitor circuit during the voltage monitoring mode.

9. The mixed-signal monitoring system of claim 8, wherein the temperature sampler circuit further comprises:
a second PN-junction and a third PN-junction, each coupled to respective inputs of the temperature-mode input-capacitor circuit; and
a current supply comprising a first current source and a second current source;
wherein the first current source is applied to the second PN-junction resulting in a second-PN-junction voltage, and the second current source is applied to the third PN-junction resulting in a third-PN-junction voltage; and
wherein a multi-phase switching device is operable to alternately:
apply the first current source to the first PN-junction during a first phase; and
apply the second current source to the first PN-junction during a second phase;
wherein switching between the first phase and the second phase results in the change in voltage across the first PN-junction; and
wherein a difference between the second-PN-junction voltage and the third-PN-junction voltage is commensurate with the change in voltage across the first PN-junction.

10. The mixed-signal monitoring system of claim 9, wherein current supplied by the first current source is an integer multiple of current supplied by the second current source.

11. A temperature-to-digital converter system, the system comprising;
an amplifier comprising a first input, a second input, a first output and a second output;
a plurality of PN-junctions comprising a first PN-junction, a second PN-junction, and a third PN-junction;
a plurality of capacitors comprising a first input capacitor, a second input capacitor, a third input capacitor, a fourth input capacitor, a first feedback capacitor, a second feedback capacitor, a third feedback capacitor, and a fourth feedback capacitor;
a current supply comprising a first current source, a second current source, a third current source and a fourth current source;
a first switch and a second switch;
a reference voltage capacitor network coupled to the first input and the second input;
an offset reference voltage capacitor network coupled to the first input and the second input;
a comparator coupled to the first output and second output; and
an output filter coupled to the comparator;
wherein a first terminal of the first PN-junction is coupled to the first input through the first input capacitor, and a second terminal of the PN-junction is coupled to the second input through the second input capacitor;
wherein the third current source is applied to the second PN-junction, and the fourth current source is applied to the third PN-junction;
wherein the first switch is operable to:
couple an output common mode voltage (Vcmo) to the first input through the third input capacitor;
couple the first input to the first output through the third feedback capacitor;
couple Vcmo to the second input through the fourth input capacitor;
couple the second input to the second output through the fourth feedback capacitor; and
apply the first current source to the first PN-junction;
wherein the second switch operable to:
couple the second PN-junction to an input common mode voltage (Vcmi) through the third input capacitor;
couple the first input to the first output through the first feedback capacitor;
couple the third PN-junction to the Vcmi through the fourth input capacitor; and
couple the second input to the second output through the second feedback capacitor; and
apply the second current source to the first PN-junction;
wherein the first switch is closed when the second switch is open, and the second switch is closed when the first switch is open; and
wherein the output filter is operable to output a digital numeric value representative of a temperature of the first PN-junction.

12. The system in claim 11, wherein the amplifier, the plurality of capacitors, the first switch, the second switch, the reference voltage capacitor network, the comparator, and the output filter are comprised in an ADC.

13. The system in claim 12, wherein the first switch is controlled by a first clock signal, and the second switch is controlled by a second clock signal;
wherein the first clock signal and the second clock signal are non-overlapping clock signals.

14. The system in claim 11;
wherein current provided by the first current source is equal to current provided by the third current source;
wherein current provided by the second current source is equal to current provided by the fourth current source; and
wherein the current provided by the first current source is an integer multiple of the current provided by the second current source.

15. The system of claim 11, wherein the first PN-junction, the second PN-junction and the third PN-junction are comprised on one integrated circuit.

16. The system of claim 11, wherein the system is comprised on one integrated circuit.

17. A mixed-signal monitoring system comprising:
a switched-capacitor integrator;
a first PN-junction coupled to the switched-capacitor integrator;
a comparator coupled to an output of the switched-capacitor integrator;
a decimation filter coupled to an output of the comparator; and
a current-switching device alternately applying a first current and a second current to the first PN-junction for providing a $\Delta V_{BE}$ of the first PN-junction to the input of the switched-capacitor integrator;
wherein an output of the comparator is coupled to an input of the switched-capacitor integrator, thereby forming a feedback loop;
wherein the switched-capacitor integrator is operable to output a voltage signal representative of a temperature of the first PN-junction; and
wherein the decimation filter is operable to output a digital numeric value representative of the temperature of the first PN-junction.

18. The mixed-signal monitoring system of claim 17;
wherein the switched-capacitor integrator is configured as an auto-zeroed switched-capacitor integrator and comprises a first input capacitor path, a second input capacitor path, a first charge replacement path, and a second charge replacement path;
wherein a first terminal of the first PN-junction is coupled to an input of the first input capacitor path and a second terminal of the first PN-junction is coupled to an input of the second input capacitor path;
wherein the first terminal of the PN-junction is further coupled to an input of the second charge replacement path and the second terminal of the first PN-junction is further coupled to an input of the first charge replacement path;
wherein an output of the first charge replacement path is coupled to an output of the first input capacitor path and an output of the second charge replacement path is coupled to an output of the second input capacitor path; and
wherein the $\Delta V_{BE}$ of the first PN-junction is measured between the first terminal of the PN-junction and the second terminal of the PN-junction.

19. The mixed-signal monitoring system of claim 17 further comprising a second PN-junction and a third PN-junction;
wherein the switched-capacitor integrator is configured as an auto-zeroed switched-capacitor integrator and comprises an input capacitor path, a first charge replacement path, and a second charge replacement path;
wherein the second PN-junction is coupled to the first charge replacement path and the third PN-junction is coupled to the second charge replacement path;
wherein the first PN-junction is coupled to the input capacitor path;
wherein a third current is applied to the second PN-junction resulting in a junction-voltage ($V_{BE}$) across the second PN-junction, and a fourth current is applied to the third PN-junction resulting in a $V_{BE}$ across the third PN-junction;
wherein a voltage difference between the $V_{BE}$ across the second PN-junction and the $V_{BE}$ across the third PN-junction is commensurate with the $\Delta V_{BE}$ of the first PN-junction.

20. The mixed-signal monitoring system of claim 17, wherein the switched-capacitor integrator, the comparator and the decimation filter are configured in an ADC.

21. A method for temperature-to digital conversion, the method comprising:
obtaining a $\Delta V_{BE}$ of a first PN-junction representative of a temperature of the first PN-junction;
amplifying the $\Delta V_{BE}$ of the first PN-junction resulting in an amplified $\Delta V_{BE}$ of the first PN-junction;
subtracting an offset voltage from the amplified $\Delta V_{BE}$ of the first PN-junction resulting in a temperature voltage signal;
converting the temperature voltage signal to a digital numeric value and outputting the digital numeric value;
wherein said amplifying, said subtracting and said converting are collectively performed by an ADC.

22. The method of claim 21, wherein said obtaining the $\Delta V_{BE}$ of the first PN-junction comprises alternately applying a first current and a second current to the first PN-junction.

23. The method of claim 21, wherein the ADC is a delta-sigma ADC comprising an auto-zeroed switched-capacitor integrator circuit.

24. The method of claim 23, wherein said obtaining the $\Delta V_{BE}$ of the first PN-junction comprises alternately applying a first current and a second current to the first PN-junction;
wherein said applying the first current is performed during a sampling phase of the auto-zeroed switched-capacitor integrator circuit; and
wherein said applying the second current is performed during an integration phase of the auto-zeroed switched-capacitor integrator circuit.

25. The method of claim 24, wherein said amplifying includes:
applying the first current to a second PN-junction resulting in a $V_{BE}$ across the second PN-junction, and providing the $V_{BE}$ across the second PN-junction to a first input of the auto-zeroed switched-capacitor integrator circuit;
applying the second current to a third PN-junction resulting in a $V_{BE}$ across the third PN-junction, and providing the $V_{BE}$ across the third PN-junction to a second input of the auto-zeroed switched-capacitor integrator circuit;
wherein a voltage difference between the $V_{BE}$ across the second PN-junction and the $V_{BE}$ across the third PN-junction is commensurate with the $\Delta V_{BE}$ signal.

26. The method of claim 21, wherein the ADC is a pipeline ADC.

27. The method of claim 21, wherein the ADC is a cyclic ADC.

* * * * *